United States Patent [19]

Okabayashi et al.

[11] Patent Number: 4,897,673

[45] Date of Patent: Jan. 30, 1990

[54] METHOD FOR CONNECTING NOZZLE TUBE OF INK JET NOZZLE WITH PIEZOELECTRIC ELEMENT

[75] Inventors: Mitsumasa Okabayashi; Hisahiro Shimizu, both of Tokyo, Japan

[73] Assignee: Juki Corporation, Tokyo, Japan

[21] Appl. No.: 316,515

[22] Filed: Feb. 28, 1989

[51] Int. Cl.[4] ..................................... G01D 15/18

[52] U.S. Cl. ................................ 346/140 R; 346/1.1

[58] Field of Search ............... 346/75, 140 IJ, 140 PD

[56] References Cited

U.S. PATENT DOCUMENTS 4,308,546 12/1981 Halasz ................................ 346/75 X 4,415,909 11/1983 Italiano et al. ..................... 346/75 X

*Primary Examiner*—George H. Miller, Jr.

*Attorney, Agent, or Firm*—Tarolli, Sundheim & Covell

[57] ABSTRACT

A method for connecting a nozzle tube of an ink jet nozzle of an ink jet printer with a piezoelectric element utilizing a bonding agent, which comprises steps of applying a coating of a material having a relatively low adhesive property to the bonding agent on at least a portion of the piezoelectric element being disposed adjacent to the nozzle tube, and securing the piezoelectric element to the nozzle tube with the bonding agent being applied between the coating and the nozzle tube. The degradation of the characteristics of the piezoelectric element due to the difference in the coefficient of thermal expansion of the piezoelectric element and the bonding agent can be avoided.

4 Claims, 2 Drawing Sheets

PRIOR ART

METHOD FOR CONNECTING NOZZLE TUBE OF INK JET NOZZLE WITH PIEZOELECTRIC ELEMENT

FIELD OF THE INVENTION

This invention relates generally to an ink jet printer and, particularly, to a method for connecting a nozzle tube of an ink jet nozzle of the ink jet printer with a piezoelectric element which is used to actuate the ink jet nozzle.

DESCRIPTION OF PRIOR ART

There are various types of ink jet printers, and FIG. 2 shows schematically one of them.

The ink jet printer shown in FIG. 2 comprises a cassette 1 receiving therein printing paper(s) 2 and disposed vertically in the printer. The printing paper 2 is taken out of the cassette 1 and is delivered around a rotating printing head 3 whereat a predetermined printing is applied thereon and, then, the printing paper is delivered upward.

The printing head 3 comprises a plurality of ink jet nozzles 4 which are arranged radially outward from the axis of rotation of the printing head 3.

The ink jet nozzle 4 is, as shown in FIG. 3, typically comprises a nozzle tube 5 having a tapered nozzle on one end and being formed of glass or synthetic resin material, and a generally cylindrical piezoelectric element 6 encircling and being secured to the nozzle tube 5. Usually, bonding agent such as epoxy resin 7 is used to secure the nozzle tube 5 with the piezoelectric element 6. The piezoelectric element 6 is constituted of a cylindrical piezoelectric material 8, and mutually insulated electrodes 9*a* and 9*b* being provided on the outer and inner surfaces of the piezoelectric material 8 respectively and being connected respectively with lead wires 10*a* and 10*b*. Shown at numeral 9*c* in FIG. 3 is an insulating gap between the electrodes 9*a* and 9*b*. When an electric voltage is applied between the electrodes 9*a* and 9*b*, the piezoelectric material 8 is contracted such that the nozzle tube 5 reduces its diameter whereby ink is ejected from the jet nozzle. The electrodes 9*a* and 9*b* are usually formed of metal platings such as Nickel platings.

When the ink is a solid ink, it is required to heat the nozzle tube 5 and, accordingly, the bonding agent 7 of epoxy resin is also heated. Thus, the bonding agent 7 tends to expand during the actuation of the printer and to contract during the non-actuating condition of the printer. Further, in the prior art ink jet nozzle 4 shown in FIG. 3, the bonding agent 7 of epoxy resin contacts directly with the electrode 9*b* on the inner circumference of the piezoelectric material 8, thus, the electrode 9*b* of metal plating layer will sometimes be peeled off the piezoelectric material 8 when the bonding agent 7 is cooled to low temperature due to the difference in the coefficient of thermal expansion between the epoxy resin and the piezoelectric material. It will be understood that the coefficient of thermal contraction at low temperature of epoxy resin is larger than that of the piezoelectric material.

When the electrode is peeled off the piezoelectric material, the characteristics of the piezoelectric element 6 are adversely affected such that the change in the impedance due to the change in the capacitance, the change in the resonance frequency, the decrease in the mechanical strength and the like.

The present invention has been made to solve the problems aforementioned.

SUMMARY OF THE INVENTION

According to the invention, there is provided a method for connecting a nozzle tube of an ink jet nozzle of an ink jet printer with a piezoelectric element utilizing a bonding agent, which comprises steps of applying a coating of a material having a relatively low adhesive property to the bonding agent on at least a portion of the piezoelectric element being disposed adjacent to the nozzle tube, and securing the piezoelectric element to the nozzle tube with the bonding agent being applied between the coating and the nozzle tube, thereby avoiding degradation of the characteristics of the piezoelectric element due to the difference in the coefficient of thermal expansion of the piezoelectric element and the bonding agent.

The bonding agent may preferably be epoxy resin, and the coating applied on the piezoelectric element may preferably be fluorine contained resin (fluororesin) such as tetrafluoroethylene.

The fluororesin has a low adhesive property against with the bonding agent when the latter is cooled and is contracted whereby the degradation of the characteristics of the piezoelectric element is avoided.

BRIEF DESCRIPTION OF THE DRAWINGS

Further objects and effects of the invention will become apparent from the following detailed description in conjunction with FIG. 1 of the drawings, in which.

DETAILED DESCRIPTION OF PREFERRED EMBODIMENTS

Figure 1:
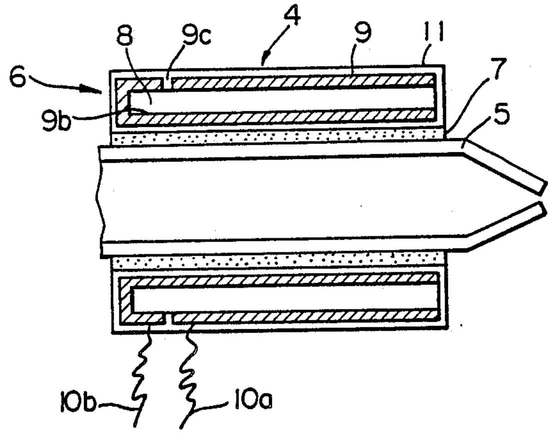
FIG. 1 is a schematic axial sectional view of an ink jet nozzle being formed according to method of the present invention.
Figure 3:
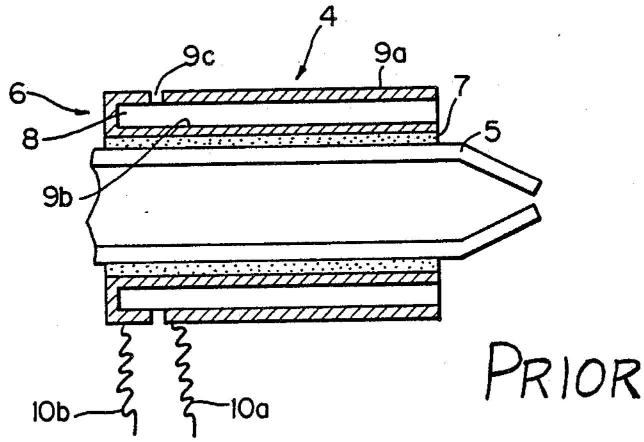
FIG. 3 is an axial sectional view of a prior art ink jet nozzle.
Figure 2:
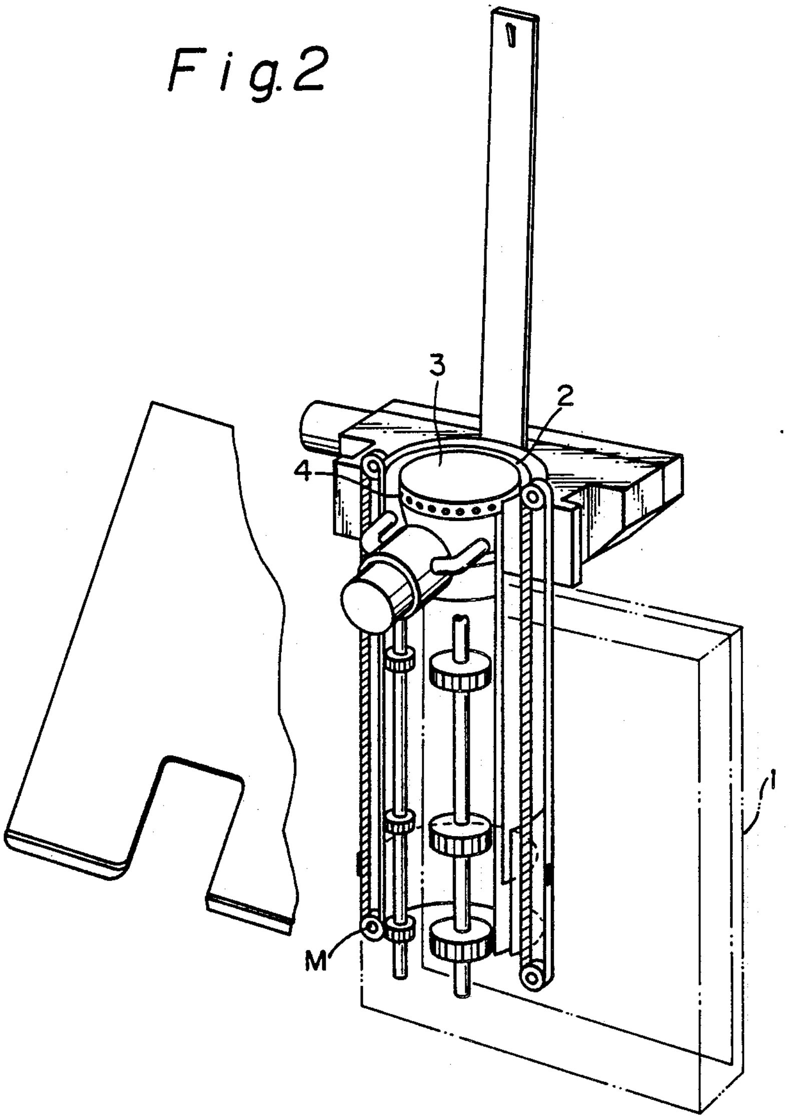
FIG. 2 is a schematic perspective view of a prior art ink jet printer.

In FIG. 1, parts corresponding to that shown in FIG. 3 are depicted by the same reference numerals.

Similar to the prior art device, the cylindrically shaped nozzle tube 5 of the ink jet nozzle 4 is provided on the outer circumferential surface the cylindrically shaped piezoelectric element 6 being secured thereto through the bonding agent 7 of epoxy resin material.

According to the invention, a coating 11 of a material having a low adhesive property against the bonding agent 7 is applied on the piezoelectric element 6.

In the embodiment of FIG. 1, the coating 11 is applied on the entire surface of the piezoelectric element 6, however, the coating 11 may be applied on a portion of the surface of the piezoelectric element 6 which is located adjacent to the bonding agent 7 or the portion covering the inner circumferential electrode 9*b*.

As described heretofore, according to the invention, a coating of a material having a relatively low adhesive property to the bonding agent on at least a portion of the piezoelectric element being disposed adjacent to the nozzle tube is applied, thus, it is possible to avoid the degradation of the characteristics of the piezoelectric element due to the difference in the coefficient of thermal expansion of the piezoelectric element and the bonding agent.

It will be understood that the embodiment described as above in connection with FIG. 1 is a mere example showing the concept of the present invention and that various changes and modifications may easily be made by those skilled in the art within the scope of the invention.

For example, the material of the coating 11 is not limited to the fluororesin, and various material having similar property are publicly known. Further, the ink jet nozzle and the piezoelectric element may have the construction different from that of FIG. 1, the bonding agent may be disposed at the location different from that of FIG. 1, and the bonding agent may not necessarily be of epoxy resin material.

What is claimed is:

1. A method for connecting a nozzle tube of an ink jet nozzle of an ink jet printer with a piezoelectric element utilizing a bonding agent, which comprises steps of applying a coating of a material having a relatively low adhesive property to the bonding agent on at least a portion of the piezoelectric element being disposed adjacent to the nozzle tube, and securing the piezoelectric element to the nozzle tube with the bonding agent being applied between the coating and the nozzle tube, thereby avoiding degradation of the characteristics of the piezoelectric element due to the difference in the coefficient of thermal expansion of the piezoelectric element and the bonding agent.

2. A connecting method according to claim 1, wherein the bonding agent is of epoxy resin material, and the coating is of fluorine contained resin material.

3. A connecting method according to claim 1, wherein the nozzle tube has a generally cylindrical shape having a nozzle opening in one end, the piezoelectric element is disposed to encircle the outer circumference of the nozzle tube, the coating is applied on the inner circumferential surface of the piezoelectric element, and thereafter, the outer circumferential surface of the nozzle tube and the inner circumferential surface of the piezoelectric element having the coating thereon are secured by utilizing the bonding agent.

4. An ink jet nozzle of an ink jet printer and comprising a generally cylindrically shaped nozzle tube having a nozzle opening in one end, a piezoelectric element of a generally cylindrical shape and encircling the outer circumference of the nozzle tube, a bonding agent applied between the outer circumferential surface of the nozzle tube and the inner circumferential surface of the piezoelectric element, and a coating of a material having an adhesive property lower than that of the bonding agent being applied on the inner circumferential surface of the piezoelectric element so as to prevent the bonding agent from contacting directly with the piezoelectric element.

* * * * *